(12) United States Patent
Nguyen et al.

(10) Patent No.: US 11,813,562 B2
(45) Date of Patent: Nov. 14, 2023

(54) SYSTEMS AND METHODS FOR CAPTURING CARBON DIOXIDE IN EXHAUST GAS

(71) Applicant: Halliburton Energy Services, Inc., Houston, TX (US)

(72) Inventors: Philip D. Nguyen, Houston, TX (US); Ronald Glen Dusterhoft, Houston, TX (US); Stanley Vernon Stephenson, Duncan, OK (US); Timothy Holiman Hunter, Duncan, OK (US); Andrew Silas Clyburn, Duncan, OK (US); Adam Lynn Marks, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 83 days.

(21) Appl. No.: 17/590,248

(22) Filed: Feb. 1, 2022

(65) Prior Publication Data

US 2023/0241543 A1 Aug. 3, 2023

(51) Int. Cl.
*B01D 53/04* (2006.01)
*B01D 53/62* (2006.01)
*B01D 53/047* (2006.01)

(52) U.S. Cl.
CPC ..... *B01D 53/0438* (2013.01); *B01D 53/0446* (2013.01); *B01D 53/0462* (2013.01); *B01D 53/0476* (2013.01); *B01D 53/62* (2013.01); *B01D 2257/504* (2013.01); *B01D 2258/0283* (2013.01); *B01D 2259/402* (2013.01)

(58) Field of Classification Search
CPC .... B01D 53/00; B01D 53/04; B01D 53/0438; B01D 53/0446; B01D 53/0407

USPC .......................................................... 95/115
See application file for complete search history.

(56) References Cited

U.S. PATENT DOCUMENTS

| | | |
|---|---|---|
| 7,618,606 B2 | 11/2009 | Fan et al. |
| 7,966,829 B2 | 6/2011 | Finkenrath et al. |
| 8,500,855 B2 | 8/2013 | Eisenberger |
| 8,771,403 B2 | 7/2014 | Chang et al. |
| 9,155,996 B2 | 10/2015 | Wilcox et al. |
| 9,283,511 B2 | 3/2016 | Tour et al. |

(Continued)

FOREIGN PATENT DOCUMENTS

WO 2017/051610 A1 3/2017

*Primary Examiner* — Sharon Pregler
(74) *Attorney, Agent, or Firm* — Conley Rose, P.C.; Rodney B. Carroll

(57) ABSTRACT

The disclosure provides a method and system for extracting carbon dioxide from an exhaust gas. The method includes lowering a temperature of an exhaust gas using a heat exchanger, lowering a concentration of a particulate matter within the lowered temperature exhaust gas, and passing the lowered particulate concentration and lowered temperature exhaust gas through one or more membrane modules to produce a membrane module permeate flow that contains a higher concentration of carbon dioxide compared to a concentration of carbon dioxide in the lowered particulate concentration and lowered temperature exhaust gas. Further, the system includes a heat exchanger fluidly coupled to a particulate filter that is configured to lower a concentration of the particulate matter within the exhaust gas, and one or more membrane modules fluidly coupled to the particulate filter and configured to produce the membrane module permeate flow.

20 Claims, 4 Drawing Sheets

(56) References Cited

U.S. PATENT DOCUMENTS

| | | |
|---|---|---|
| 9,314,730 B1 | 4/2016 | Sayari et al. |
| 9,371,755 B2 | 6/2016 | Hamad |
| 9,457,323 B2 | 10/2016 | Aburaya et al. |
| 2011/0296872 A1* | 12/2011 | Eisenberger ........... B01J 20/103 |
| | | 96/111 |
| 2022/0331737 A1* | 10/2022 | DiPietro .............. B01D 53/268 |

* cited by examiner

SYSTEMS AND METHODS FOR CAPTURING CARBON DIOXIDE IN EXHAUST GAS

TECHNICAL FIELD OF THE INVENTION

The present disclosure relates generally to systems and methods for the capture of carbon dioxide from exhaust gas.

BACKGROUND

Large volumes of exhaust gas, such as flue gas, are emitted as a result of the combustion of fuels by engines, ovens, furnaces, boilers, or steam generators across a wide variety of industries, such as the power generation industry, the transportation industry, and the oil and gas industry. For example, a volume of 300 million cubic feet of exhaust gas may be produced per day from a typical hydraulic fracturing operation at a well site. The composition of exhaust gas depends on what fuels are being burned, but exhaust gas typically consists of nitrogen, carbon dioxide (hereinafter "$CO_2$"), water vapor, excess oxygen, and a small percentage of a number of pollutants, such as particulate matter (e.g., soot), carbon monoxide, nitrogen oxides, and sulfur oxides. In order for these industries to meet climate goals, emissions of some of the greenhouse gases contained in the produced exhaust gases must be limited or eliminated. Thus, it is beneficial to the environment that gases such as $CO_2$ be extracted from exhaust gas before the exhaust gas is vented into the atmosphere. This extracted $CO_2$ can then be stored and/or repurposed instead of being vented into the atmosphere.

Conventional methods of capturing and separating $CO_2$ from exhaust gas typically require two steps: (1) absorption of the $CO_2$-rich gas in a lean aqueous solution of a solvent in a reactor called an absorber; and (2) separation of the $CO_2$ from the enriched solvent in a reactor called a stripper. Large footprints of equipment are often required with conventional $CO_2$ capture methods as the absorbers and strippers are typically large, stationary assemblies that require additional machinery for temperature and pressure control. Specifically, the absorption process carried out by the absorbers is enhanced at low temperatures and high pressures, while the stripping process carried out by the strippers is enhanced at high temperatures and low pressures. Thus, the absorption and stripping process of conventional $CO_2$ capture methods requires a cooling source, a heating source, and a compressor to increase the exhaust gas pressure before it enters the absorber. Besides the amount of equipment and the large footprint necessary for conventional $CO_2$ capture methods, there are other disadvantages of the conventional $CO_2$ capture methods. Other disadvantages include the thermal efficiency losses due to the energy needed to regenerate the solvent, the formation of degradation products formed by the solvent reaction with the exhaust gas, and associated corrosion problems. Further, the systems typically present difficulties with handling liquids and the energy penalties associated with the loss of solvents due to evaporation. Additionally, the conventional $CO_2$ capture systems typically can only handle limited volumes of exhaust gas to capture $CO_2$.

Figure 1:
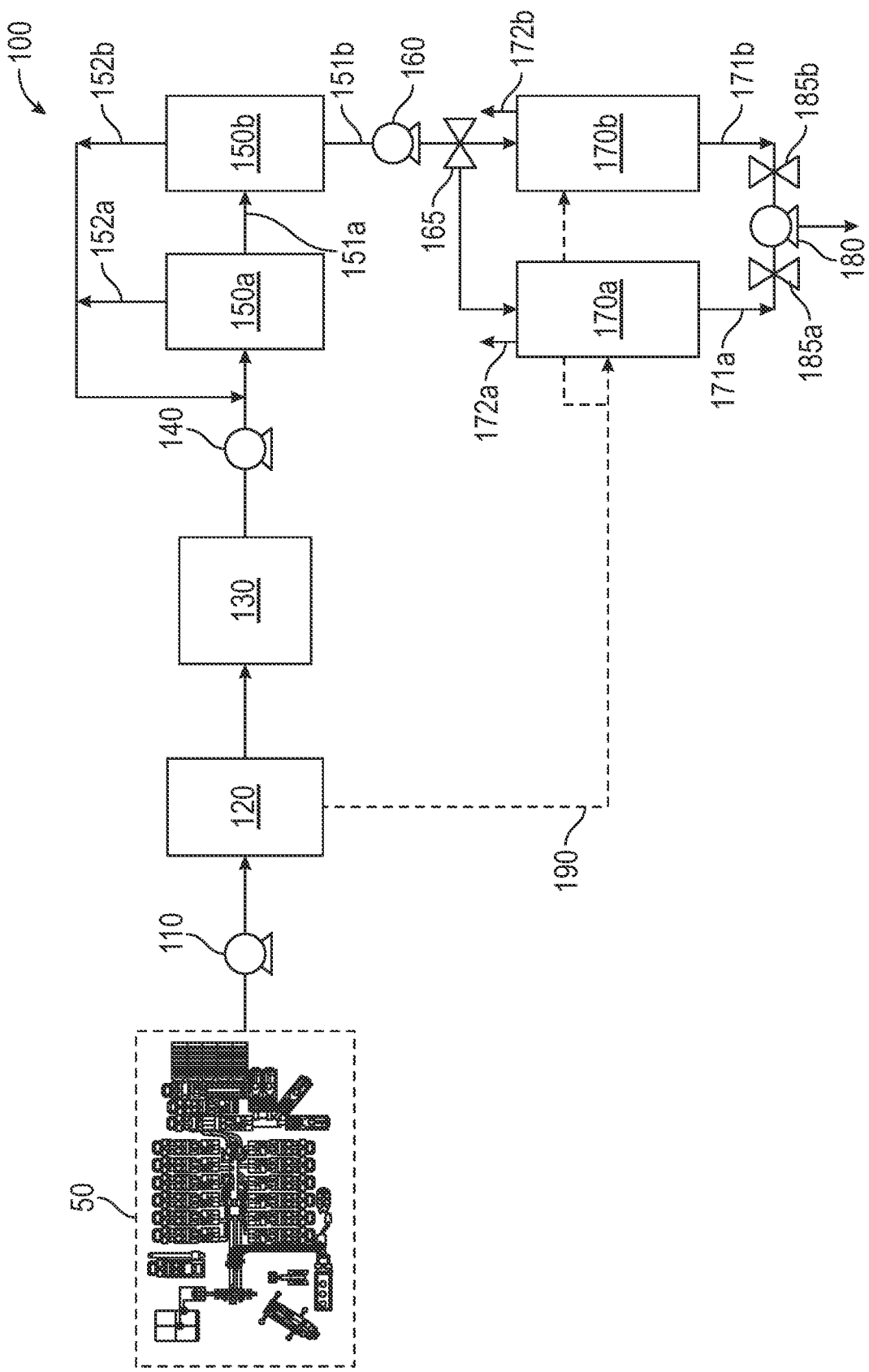
FIG. 1 is an illustrative schematic for a $CO_2$ capture system according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

A $CO_2$ capture system and method able to extract concentrated or substantially pure $CO_2$ from an exhaust gas is desired. In one or more embodiments, the $CO_2$ capture system may include a heat exchanger, a particulate filter, one or more membrane modules, and one or more adsorbent packed beds. The heat exchanger may be fluidly coupled to an exhaust gas source, and the exhaust gas may be pumped through the heat exchanger in order to lower the temperature of the exhaust gas. The heat exchanger may further be fluidly coupled to the particulate filter such that the lowered temperature exhaust gas may be pumped through the particulate filter to remove particulate matter from within the exhaust gas, such as soot. The particulate filter may further be fluidly coupled to the one or more membrane modules such that the exhaust gas, which is at least partially free of particulate, may be pumped through the one or more membrane modules. The membrane modules may be configured to extract a permeate that contains a more concentrated $CO_2$ and may be configured to recirculate and further filter the retentate that contains the exhaust gas with less concentrated $CO_2$. In one or more embodiments, the capture system may include two or more membrane modules disposed in series such that the permeate that contains a more concentrated $CO_2$ is run through further membrane modules to further concentrate the $CO_2$ in the permeate. Further, the one or more membrane modules may be fluidly coupled to the one or more adsorbent packed beds, and after the permeate with the most concentrated $CO_2$ is extracted from the one or more membrane modules, the concentrated $CO_2$ may be pumped into the one or more adsorbent packed beds. The one or more adsorbent packed beds may include sorbents configured to attach to and extract $CO_2$ from the concentrated $CO_2$. The $CO_2$ extracted by the adsorbent packed bed may be substantially pure $CO_2$, which may be pumped from the one or more adsorbent packed beds to a location to be reused or stored.

Illustrative embodiments of the present invention are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

The terms "couple" or "couples," as used herein, are intended to mean either an indirect or direct connection. Thus, by way of example, if a first machine or equipment is fluidly coupled to a second device, that connection may be through a direct physical connection or through an indirect connection by way of hoses, pipelines, pumps and/or valves. Further, the term "pure CO2," as used herein, is intended to mean a fluid with a concentration of 100% CO2, while the term "substantially pure CO2" is intended to mean a fluid with a concentration of CO2 of at least 90% but preferably greater than or equal to 95%.

FIG. 1 illustrates a schematic of a CO2 capture system 100 for extracting CO2 from an exhaust gas according to one or more aspects of the present disclosure. As depicted, in one or more embodiments, the CO2 capture system may include a heat exchanger 120, a particulate filter 130, a first membrane module 150a, a second membrane module 150b, a first adsorbent packed bed 170a, and a second adsorbent packed bed 170b. The CO2 capture system 100 may further include a plurality of pumps 110, 140, 160, and 180, a plurality of valves 165, 185a, and 185b, and a heated fluid flow line 190.

The heat exchanger 120 may be configured to receive a flow of exhaust gas from an exhaust gas source 50, to lower the temperature of the exhaust gas, and to distribute the lowered temperature exhaust gas to the particulate filter 130. In one or more embodiments, the exhaust gas source 50 may be any machine that produces exhaust gas including, but not limited to, a pump, a power generation unit, an engine, an oven, a furnace, or a boiler using any type of fuel such as diesel, natural gas, or diesel and natural gas mixtures. By way of example, the exhaust gas source 50 may be equipment operating at a wellsite to carry out wellbore operations, such as fracturing equipment. Further, in one or more embodiments, the exhaust gas source 50 may be configured to capture the exhaust gas it produces so that the exhaust gas may be distributed into the CO2 capture system 100. Furthermore, the heat exchanger 120 may be fluidly coupled to the exhaust gas source 50 by way of a first pump 110. The first pump 110 may be configured to pump the exhaust gas from the exhaust gas source 50 through the heat exchanger 120 so as to lower the temperature of the exhaust gas which is received from the exhaust gas source 50 at a high temperature. The temperature of the exhaust gas which is received from the exhaust gas source 50 may be any temperature, but typically, the temperature is less than or equal to 1000° F. Further, the heat exchanger 120 may be configured to lower the temperature of the exhaust gas at least to below the maximum operating temperature of the membrane modules 150a, 150b, which may be 200° F. However, in one or more embodiments, the heat exchanger 120 may be configured to lower the temperature of the exhaust gas received from the exhaust gas source 50 to below 100° F. Thus, by way of example, the heat exchanger 120 may receive the exhaust gas from the exhaust gas source 50 at 1000° F., and the heat exchanger 120 may lower the temperature of the exhaust gas to below 100° F. Furthermore, a heat exchanger fluid may be flowed through the heat exchanger 110 in order to lower the temperature of the exhaust gas, and the heat exchanger fluid may exit the heat exchanger 110 at a high temperature and may be recirculated or delivered to the first adsorbent packed bed 170a and/or the second adsorbent packed bed 170b by way of the heated fluid flow line 190.

Further, the particulate filter 130 may be configured to receive a flow of lowered temperature exhaust gas from the heat exchanger 120, to lower a concentration of a particulate matter within the lowered temperature exhaust gas, and to distribute the lowered particulate concentration and lowered temperature exhaust gas to the first membrane module 150a. In one or more embodiments, the heat exchanger 120 may be fluidly coupled to the particulate filter 130, and the first pump 110 may be configured to pump the exhaust gas through particulate filter 130 in addition to the heat exchanger 120. The particulate filter 130 may be any of a number of filters sufficient to remove particulate matter from the exhaust gas to lower the concentration of the particulate matter within the lowered temperature exhaust gas. By way of example, the particulate matter within the exhaust gas may be any small particles of solid material, such as soot, and/or small liquid droplets. Further, by way of example, the particulate filter 130 may remove the particulate matter by any of a cyclonic separation process, an electrostatic process, a tortuous path filtration process, or a process of passing the exhaust gas through a media filter, a venturi type scrubber, a liquid bath filter, a catalytic converter, or a diesel particulate filter to lower the concentration of the particulate matter within the lowered temperature exhaust gas. In one or more embodiments, the particulate filter 130 may remove 100% of the particulate matter from the lowered temperature exhaust gas. However, in other embodiments, because particulate filters 130 are not always perfect, a substantial amount of particulate matter may be removed from the lowered temperature exhaust gas, where a substantial amount may be greater than or equal to 90% of the particulate matter in the lowered temperature exhaust gas. In still further embodiments, the particulate filter 130 may remove at least greater than or equal to 50% of the particulate matter in the lowered temperature exhaust gas. Furthermore, while one particulate filter 130 is depicted, in one or more embodiments, a plurality of particulate filters 130 may be used in series or parallel. Additionally, the particulate filter 130 may be fluidly coupled to the first membrane module 150a, and a second pump 140 may be disposed between the particulate filter 130 and the first membrane module 150a and configured to pump the lowered particulate concentration and lowered temperature exhaust gas into and through the membrane modules 150a, 150b.

As such, the membrane modules 150a and 150b may be configured to receive a flow of the lowered particulate concentration and lowered temperature exhaust gas from the particulate filter 130, to extract a fluid of concentrated CO2 from the exhaust gas, and to distribute the fluid of concentrated CO2 to the adsorbent packed beds 170a, 170b. In one or more embodiments, the membrane modules 150a and 150b may be any filters configured to generate a gas-rich permeate of CO2. Specifically, each membrane module contains a membrane (not explicitly shown) that is packed inside the membrane module and that will separate gases such as CO2 from the exhaust gas (e.g., an exhaust gas composed of a CO2 and nitrogen (hereinafter "N2") mixture) as long as the gas to be separated from the gas mixture is able to pass through the membrane more rapidly than the other components of the exhaust gas. In other words, the flux of the CO2 should be higher than the N2 under the same conditions for the membrane to extract the CO2 from the exhaust gas. In one or more embodiments, the membrane of the membrane modules 150a, 150b is a polymeric membrane. More specifically, the membrane modules 150a, 150b may be a porous membrane, which is configured to separate gases through small pores in the membrane based on molecular size. By way of example, the membrane modules 150a and 150b may include spiral wound membranes and may include a permeate collection tube that is wrapped with a plurality of layers of feed channel spacers, a permeate collection material, a membrane, a feed channel spacer, and an outer wrap. Further, the exhaust gas may be pumped into a first end of the membrane module such that as the exhaust gas flows through the membrane module, the CO2 passes through the membrane and into the permeate collection tube, while the N2 and other components of the exhaust gas are generally kept out of the permeate collection tube by the membrane. Thus, once the exhaust gas reaches the second end of the membrane module, a membrane module permeate flow (e.g., 151a and 151b), which exits the permeate collection tube, will contain a higher concentration of CO2 compared to the other components of the exhaust gas, while the membrane module retentate flow (e.g., 152a and 152b) contains the exhaust gas with a lower concentration of CO2. While in one or more embodiments, the membranes of the membrane modules 150a, 150b may be porous, spiral wound membranes, in other embodiments, the membranes may be porous, hollow fiber membranes. Additionally, while in one or more embodiments, the membranes may be porous membranes, in other embodiments, the membranes of the membrane modules 150a, 150b may be a non-porous membranes, which are configured to extract CO2 by way of a solution-diffusion mechanism. Further, in other embodiments, the membranes of the membrane modules 150a, 150b may be carbon-nanotube membranes.

Thus, the lowered particulate concentration and lowered temperature exhaust gas may be received by the first membrane module 150a from the particulate filter 130 by way of the pump 140, and the first membrane module 150a may produce a first membrane module permeate flow 151a, which contains a flow of concentrated CO2, and a first membrane module retentate flow 152a, which contains the exhaust gas with a lower concentration of CO2. The first membrane module retentate flow 152a may be recirculated into the CO2 capture system 100 such that it is mixed with the lowered particulate concentration and lowered temperature exhaust gas and is run through the first membrane module 150a again. Further, the first membrane module permeate flow 151a may be distributed to and run through the second membrane module 150b. Thus, the second membrane module 150b may produce a second membrane module permeate flow 151b, which contains a flow with an even higher concentration of CO2, and a second membrane module retentate flow 152b, which contains the components of the first membrane module permeate flow 151a that did not pass through the membrane of the second membrane module 150b and enter the second membrane module permeate flow 151b. The second membrane module retentate flow 152b may be recirculated into the CO2 capture system 100 such that it is mixed with the lowered particulate concentration and lowered temperature exhaust gas exhaust gas and the first membrane module retentate flow 152a and is run through the first membrane module 150a again. Furthermore, the second membrane module permeate flow 151b containing the higher concentration of CO2 may be distributed to one of the adsorbent packed beds 170a, 170b by way of a third pump 160 and a first valve 165. In one or more embodiments, the first valve 165 may be configured to selectively distribute the second membrane module permeate flow 151b to the first adsorbent packed bed 170a and the second adsorbent packed bed 170b either separately or simultaneously.

While two membrane modules 150a and 150b are depicted, in one or more embodiments, the CO2 capture system 100 may include a single membrane module 150a, with the first membrane module permeate flow 151a being distributed to one of the adsorbent packed beds 170a, 170b. Further, in one or more embodiments, more than two membrane modules may be included in the CO2 capture system 100 with each additional membrane module run in series with the other membrane modules. The more membrane modules the exhaust gas is run through, the higher the concentration of CO2 will be in the permeate flow of the last of the membrane modules. The number of membrane modules used in the CO2 capture system 100 may be determined based on the level of concentration of CO2 desired in the final membrane module permeate flow and the desired budget for the plurality of membrane modules. Additionally, as membranes are not perfect at extracting CO2 from the exhaust gas, some of the other components of the exhaust gas may still permeate through the membranes no matter how many passes the permeate flow makes through membrane modules, and thus, the membrane module permeate flow of the last membrane modules will still be a flow of concentrated CO2 instead of a flow of pure CO2 or substantially pure CO2. Thus, to extract a flow of substantially pure CO2, the permeate flow of the last of the membrane modules must be run through one of the adsorbent packed beds 170a and 170b.

The adsorbent packed beds 170a and 170b may be connected to the CO2 capture system 100 in parallel and may be fluidly coupled to and configured to receive a flow of the concentrated CO2 from the last of the membrane modules (e.g., the second membrane module 150b as depicted), to extract substantially pure CO2 from the flow of concentrated CO2, to release the other components of the concentrated CO2, and to output the substantially pure CO2 from the CO2 capture system 100. Two adsorbent packed beds 170a and 170b may be used in parallel such that when one adsorbent packed bed is being rejuvenated after producing substantially pure CO2 from the second membrane module permeate flow 151b, the other adsorbent packed bed may be filled with another portion of the second membrane module permeate flow 151b to maintain an efficient and continuous extraction of CO2 from exhaust gas. While two adsorbent packed beds 170a and 170b are depicted, in one or more embodiments, a single adsorbent packed bed 170a may be used in the CO2 capture system 100. Further, in other embodiments, more than two adsorbent packed beds may be used in the CO2 capture system 100 with each additional adsorbent packed bed run in parallel with the other adsorbent packed beds. The more adsorbent packed beds used in the CO2 capture system 100, the more efficient the system may be in extracting substantially pure CO2 from the second membrane module permeate flow 151b. The number of adsorbent packed beds used in the CO2 capture system 100 may be determined based on the desired rate at which substantially pure CO2 is output from the system and the desired budget for the plurality of adsorbent packed beds.

In one or more embodiments, the adsorbent packed beds 170a and 170b may include sorbents, such as solid adsorbents, having mesoporous and microporous sieves in which CO2 adsorption is a physical process controlled by the pore characteristics of the sorbent. In one or more embodiments, the sorbents that may be used in the adsorbent packed beds 170a and 170b may include one or more of carbon-based adsorbents, zeolites, hydrotalcite-like compounds, and porous crystals. Additionally, since simple porous adsorbents such as activated carbons and zeolites may have limited effectiveness when used for post-combustion CO2 capture, the surfaces on the sorbent materials and the pore spaces inside the particulates may be treated or functionalized with amine groups to improve their performance in capturing CO2.

Further, in one or more embodiments, either pressure swing adsorption (hereinafter "PSA") or thermal swing adsorption (hereinafter "TSA") may be used to extract the substantially pure CO2 from the concentrated CO2 injected into the adsorbent packed beds 170a and 170b. Both of these methods involve using the sorbent to attach to and extract the substantially pure CO2, regenerating the sorbent in the adsorbent packed bed 170a, 170b, and then reusing the adsorbent packed bed 170a, 170b. In one or more embodiments, a TSA application is used within the adsorbent packed beds 170a, 170b. When a TSA application is used within the adsorbent packed beds 170a, 170b, the sorbent in the adsorbent packed bed 170a, 170b may extract a greater amount of CO2 when the temperature of the sorbent bed of the adsorbent packed bed 170a, 170b is lower. Thus, in one or more embodiments where a TSA application is used, the flow of concentrated CO2 is fed to the sorbent bed at a low temperature for a period of time to adsorb the CO2 onto the sorbent and remove it from the flow of concentrated CO2. Once the substantially pure CO2 has been extracted using a TSA application, the adsorbent packed bed is then heated, typically by injecting a hot, clean stream of fluid, to regenerate the sorbent for reuse. In one or more embodiments, the hot, clean stream of fluid may be provided by the heated fluid flow line 190, which is configured to deliver the heated fluid that exits the heat exchanger 120 to the first adsorbent packed bed 170a and/or the second adsorbent packed bed 170b.

Alternatively, in one or more embodiments, a PSA application may be used within the adsorbent packed beds 170a, 170b. When a PSA application is used, the adsorbent capacity increases with increasing pressure. Thus, in a PSA application, the flow of concentrated CO2 is fed into the adsorbent packed beds 170a, 170b at a high pressure for a period of time to adsorb the CO2 onto the sorbent. Then, once the substantially pure CO2 has been extracted from the flow of concentrated CO2, the sorbent bed pressure is reduced to remove the adsorbed CO2 and to regenerate the sorbent in the adsorbent packed bed 170a, 170b. In one or more embodiments, a vacuum (not shown) may be included in the regeneration process when a PSA application is used to further reduce the pressure of the sorbent bed and enhance the effectiveness of regenerating the sorbent in the adsorbent packed bed 170a, 170b.

Thus, in one or more embodiments, the second membrane permeate flow 151b may be pumped into one of the first adsorbent packed bed 170a or the second adsorbent packed bed 170b by the third pump 160, where the CO2 within the second membrane permeate flow 151b may attach to the sorbent contained within the first adsorbent packed bed 170a or the second adsorbent packed bed 170b. Once the CO2 is attached to the sorbent contained within the first adsorbent packed bed 170a or the second adsorbent packed bed 170b, the release valve 172a of the first adsorbent packed bed 170a or the release valve 172b of the second adsorbent packed bed 170b may be opened so that the non-CO2 components of the second membrane module permeate flow 151b may be released from the first adsorbent packed bed 170a or the second adsorbent packed bed 170b. In one or more embodiments, the non-CO2 components of the second membrane module permeate flow 151b may be released into the atmosphere; however, in other embodiments, the non-CO2 components of the second membrane module permeate flow 151b may be captured. When the non-CO2 components of the second membrane permeate flow 151b are captured, they may be run through a separator (not shown) in order to capture certain components, such as nitrogen oxides, and may be treated. Further, once the non-CO2 components have been released from the first adsorbent packed bed 170a or the second adsorbent packed bed 170b, one of the TSA or PSA applications as discussed above may be used to release the attached CO2 from the sorbents in the first adsorbent packed bed 170a or the second adsorbent packed bed 170b. Further, a second valve 185a or a third valve 185b, which are coupled to the first adsorbent packed bed 170a and the second adsorbent packed bed 170b, respectively, may be opened to release a first substantially pure CO2 flow 171a or a second substantially pure CO2 flow 171b from the first adsorbent packed bed 170a or the second adsorbent packed bed 170b, respectively. The first substantially pure CO2 flow 171a and the second substantially pure CO2 flow 171b may be output from the CO2 capture system 100 by a fourth pump 180. As discussed above, to release the attached CO2 from the sorbents when using a TSA application, a hot, clean stream of fluid may be provided by the heated fluid flow line 190 to the adsorbent packed beds 170a, 170b in order to raise the temperature. Alternatively, as discussed above, to release the attached CO2 from the sorbents when using a PSA application, a vacuum may be coupled to the adsorbent packed beds 170a, 170b in order to lower the pressure. Further, in one or more embodiments, the first substantially pure CO2 flow 171a and the second substantially pure CO2 flow 171b output from the CO2 capture system 100 may be stored in a storage container (not shown) as a pressurized gas or a liquid and then reutilized or sold, or may be directly routed to be reutilized.

Further, while the CO2 capture system 100 is depicted as including a first adsorbent packed bed 170a and a second adsorbent packed bed 170b, in one or more embodiments, a metal organic framework (hereinafter "MOF"), which is a different class of adsorbents, may be used. MOFs are materials in which metal ions or clusters are connected via organic linkages to form highly porous network structures. MOFs are effective adsorbents for CO2 capture due to their much higher CO2 capacity when compared to that of zeolite and other sorbents.

Additionally, in one or more embodiments, the CO2 capture system 100 may be disposed on one or more mobile units (not shown) such that the entire system is mobile. More specifically, the heat exchanger 120, the particulate filter 130, the first membrane module 150a, the second membrane module 150b, the first adsorbent packed bed 170a, and the second adsorbent packed bed 170b may be disposed on and coupled to one or more mobile units (e.g., a truck or any other vehicle that can tow a flatbed or trailer). In other embodiments, any combination of one or more of the heat exchanger 120, the particulate filter 130, the first membrane module 150a, the second membrane module 150b, the first adsorbent packed bed 170a, and the second adsorbent packed bed 170b may be disposed on and coupled to one or more mobile units while the remaining parts of the system may be pre-existing at a location in which the CO2 capture system 100 is to be operated. Thus, the CO2 capture system 100 may be transported from one location to the next to capture and extract CO2 from exhaust gas from a plurality of exhaust gas sources. By way of example only, the CO2 capture system 100 may be transportable such that the CO2 capture system 100 may be brought to a first wellsite and fluidly coupled to a first fracturing equipment to capture and extract the CO2 from the exhaust gas produced therefrom, and then once the fracturing operations are completed at the first wellsite, the CO2 capture system 100 may be transported to a second wellsite and fluidly coupled to a second fracturing equipment to capture and extract the CO2 from the exhaust gas produced therefrom.

Figure 2:
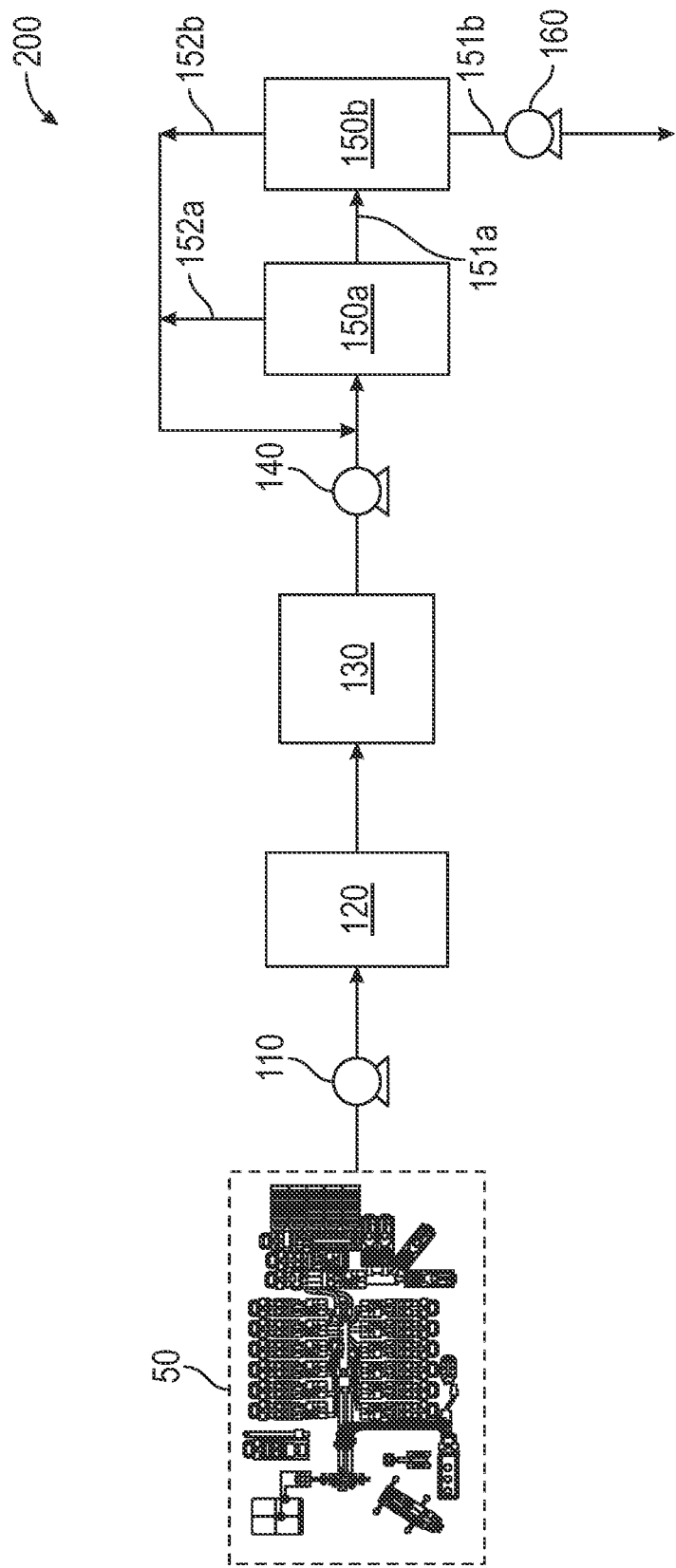
FIG. 2 is another illustrative schematic for a $CO_2$ capture system according to one or more aspects of the present disclosure.

Referring now to FIG. 2, another schematic for a CO2 capture system 200 is illustrated according to one or more aspects of the present disclosure. The CO2 capture system 200 may be substantially similar to the CO2 capture system 100 as discussed above with regard to FIG. 1 and may include a heat exchanger 120, a particulate filter 130, a first membrane module 150a, and a second membrane module 150b. Further, the CO2 capture system 200 may include a plurality of pumps 110, 140, and 160. However, unlike the CO2 capture system 100 of FIG. 1, the CO2 capture system 200 does not include a first adsorbent packed bed or a second adsorbent packed bed, and instead of outputting a flow of substantially pure CO2, the CO2 capture system 200 outputs a flow of concentrated CO2 (i.e. a membrane module permeate flow). In one or more embodiments, the concentrated CO2 output from the CO2 capture system 200 may be stored in a storage container (not shown) as a compressed concentrated CO2 and then provided to an adsorbent packed bed at a later time in a same or remote location so that the substantially pure CO2 may be extracted from the concentrated CO2. Further, in one or more embodiments, the concentrated CO2 outputted from the CO2 capture system 200 may be provided to a reactor or other equipment to undergo chemical processes to put the concentrated CO2 in a useable form and then may be stored, sold, or reutilized.

As depicted in FIG. 2, the heat exchanger 120 may be fluidly coupled to the exhaust gas source 50. Further, the first pump 110 may be disposed between the exhaust gas source 50 and the heat exchanger 120 and configured to pump a high temperature exhaust gas from the exhaust gas source 50 through the heat exchanger 120. Furthermore, as discussed above, the heat exchanger 120 may be configured to receive the flow of exhaust gas from an exhaust gas source 50, to lower the temperature of the exhaust gas, and to distribute the lowered temperature exhaust gas to the particulate filter 130. Additionally, the heat exchanger 120 may be fluidly coupled to the particulate filter 130. Further, as discussed above, the particulate filter 130 may be configured to receive a flow of lowered temperature exhaust gas from the heat exchanger 120, to lower a concentration of a particulate matter within the lowered temperature exhaust gas, and to distribute the lowered particulate concentration and lowered temperature exhaust gas to the first membrane module 150a. Furthermore, the particulate filter 130 may be fluidly coupled to the first membrane module 150a, the second pump 140 may be disposed between the particulate filter 130 and the first membrane module 150a, and the second pump 140 may be configured to pump the lowered particulate concentration and lowered temperature exhaust gas from the particulate filter 130 through the membrane modules 150a, 150b. As discussed above, the membrane modules 150a and 150b may be configured to receive a flow of the lowered particulate concentration and lowered temperature exhaust gas from the particulate filter 130, to extract a fluid of concentrated CO2 from the exhaust gas, and to output the concentrated CO2 from the CO2 capture system 200. Further, as discussed above, the first membrane module 150a may filter a concentrated CO2 from the exhaust gas, which the first membrane module 150a distributes to the second membrane module 150b, which further filters a more concentrated CO2 from the first membrane module permeate flow 151a.

Figure 3:
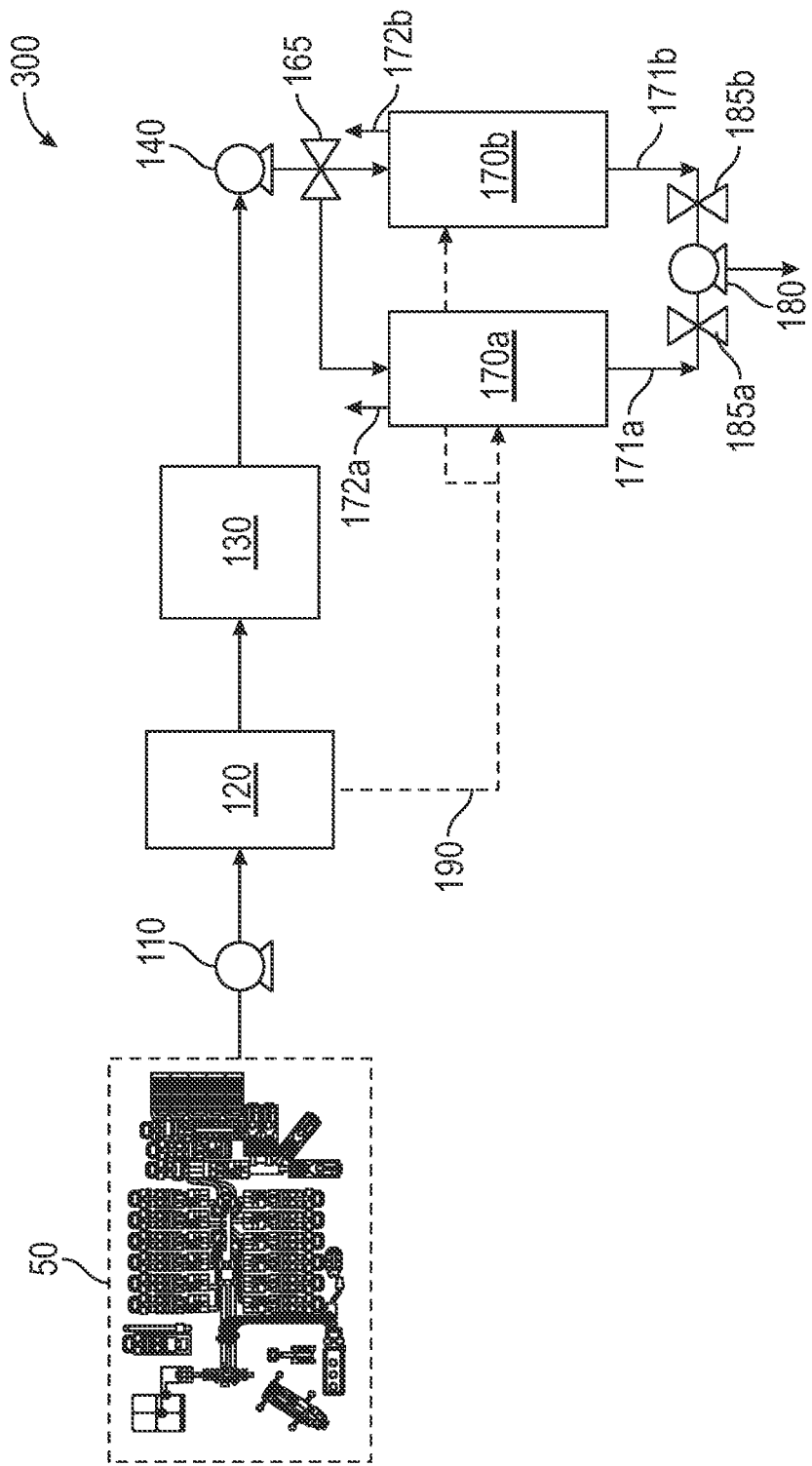
FIG. 3 is another illustrative schematic for a $CO_2$ capture system according to one or more aspects of the present disclosure.

Referring now to FIG. 3, another schematic for a CO2 capture system 300 is illustrated according to one or more aspects of the present disclosure. The CO2 capture system 300 may be substantially similar to the CO2 capture system 100 as discussed above with regard to FIG. 1 and may include a heat exchanger 120, a particulate filter 130, a first adsorbent packed bed 170a, and a second adsorbent packed bed 170b. Further, the CO2 capture system 300 may include a plurality of pumps 110, 140, and 180. However, unlike the CO2 capture system 100 of FIG. 1, the CO2 capture system 200 does not include a first membrane module or a second membrane module.

As depicted, in the CO2 capture system 300, the heat exchanger 120 may be fluidly coupled to the exhaust gas source 50. Further, the first pump 110 may be disposed between the exhaust gas source 50 and the heat exchanger 120 and configured to pump a high temperature exhaust gas from the exhaust gas source 50 through the heat exchanger 120. Furthermore, as discussed above, the heat exchanger 120 may be configured to receive the flow of exhaust gas from an exhaust gas source 50, to lower the temperature of the exhaust gas, and to distribute the lowered temperature exhaust gas to the particulate filter 130. Additionally, the heat exchanger 120 may be fluidly coupled to the particulate filter 130. Further, the particulate filter 130 may be configured to receive a flow of lowered temperature exhaust gas from the heat exchanger 120, to lower a concentration of a particulate matter within the lowered temperature exhaust gas, and to distribute the lowered particulate concentration and lowered temperature exhaust gas to the first adsorbent packed bed 170a and the second adsorbent packed bed 170b. Furthermore, the particulate filter 130 may be fluidly coupled to both the first adsorbent packed bed 170a and the second adsorbent packed bed 170b, the second pump 140 and the first valve 165 may be disposed between the particulate filter 130 and the adsorbent packed beds 170a, 170b, and the second pump 140 and the first valve 165 may be configured to selectively inject the lowered particulate concentration and lowered temperature exhaust gas from the particulate filter 130 into the first adsorbent packed bed 170a or the second adsorbent packed bed 170b. Furthermore, as discussed above, the adsorbent packed beds 170a and 170b may be connected to the CO2 capture system 100 in parallel and may be configured to extract substantially pure CO2 from the lowered particulate concentration and lowered temperature exhaust gas, to release the other components of the lowered particulate concentration and lowered temperature exhaust gas, and to output the substantially pure CO2 from the CO2 capture system 300.

Figure 4:
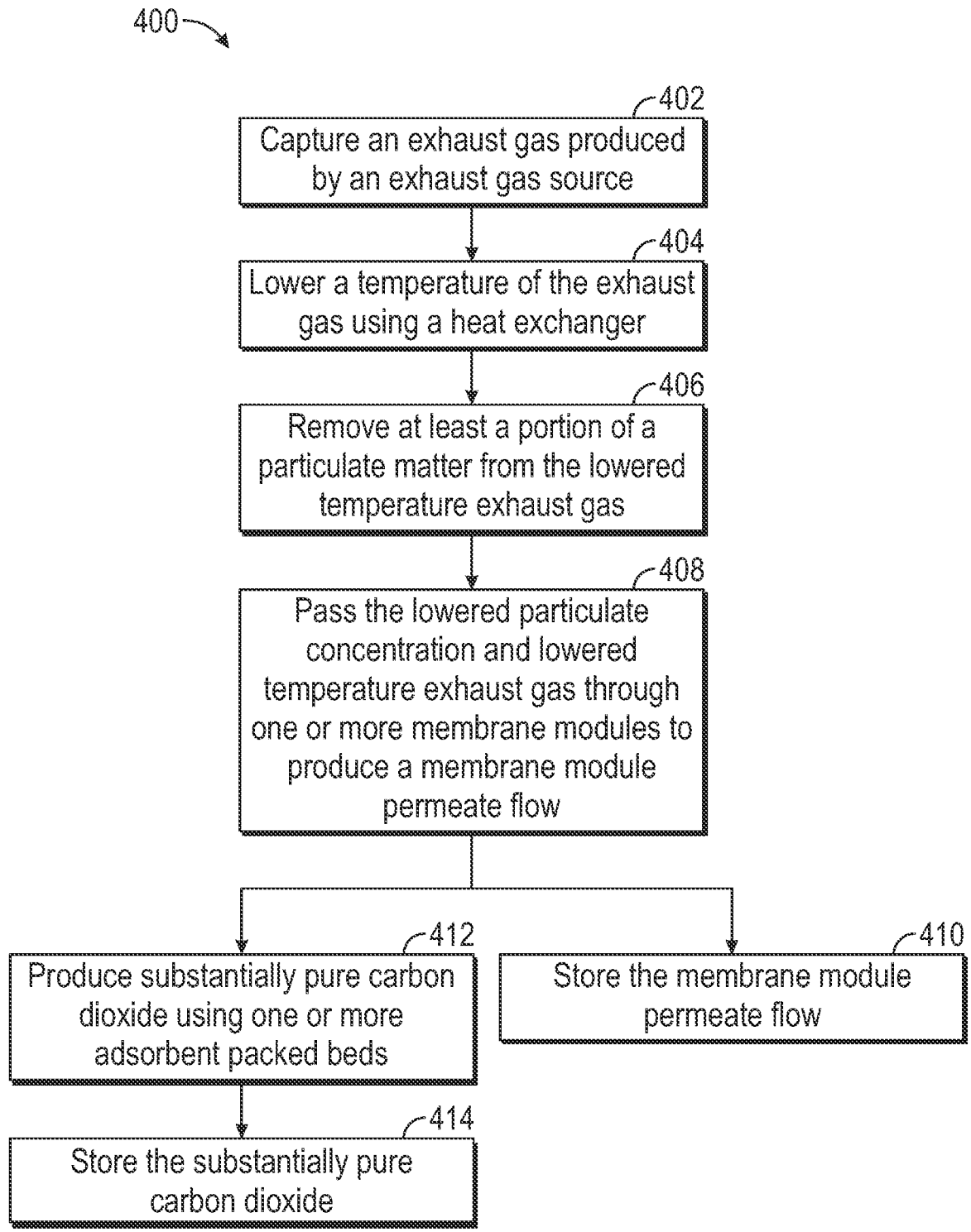
FIG. 4 is a flow chart illustrating a method for capturing $CO_2$ from an exhaust gas according to one or more aspects of the present disclosure.

Referring now to FIG. 4, a method 400 for capturing CO2 from an exhaust gas according to one or more aspects of the present disclosure is illustrated. At step 402, an exhaust gas produced by an exhaust gas source may be captured. The exhaust gas source 50 may be any machine that produces exhaust gas including, but not limited to, a pump, a power generation unit, an engine, an oven, a furnace, or a boiler using any type of fuel such as diesel, natural gas, or diesel and natural gas mixtures. By way of example, the exhaust gas source 50 may be equipment operating at a wellsite to carry out wellbore operations, such as fracturing equipment.

Further, at step 404, a temperature of the exhaust gas may be lowered using a heat exchanger. In one or more embodiments, the heat exchanger may lower the temperature of the exhaust gas to a temperature less than 200° F. Further, lowering the temperature of the exhaust gas may include passing the exhaust gas through the heat exchanger. Additionally, lowering the temperature of the exhaust gas using a heat exchanger may include flowing a heat exchanger fluid through the heat exchanger, where a temperature of the heat exchanger fluid is lower than the temperature of the exhaust gas. In one or more embodiments, flowing the heat exchanger fluid through the heat exchanger may raise the temperature of the heat exchanger fluid. Additionally, passing the exhaust gas through the heat exchanger may include pumping the exhaust gas through the heat exchanger using a first pump.

Furthermore, at step 406, a concentration of a particulate matter within the lowered temperature exhaust gas may be lowered. Further, lowering the concentration of the particulate matter within the lowered temperature exhaust gas may include passing the lowered temperature exhaust gas through a particulate filter. In one or more embodiments, 100% of the particulate matter may be removed from the lowered temperature exhaust gas. However, in other embodiments, because particulate filters are not always perfect, a substantial amount of particulate matter may be removed from the lowered temperature exhaust gas, where a substantial amount may be greater than or equal to 90% of the particulate matter in the lowered temperature exhaust gas. In still further embodiments, at least greater than or equal to 50% of the particulate matter in the lowered temperature exhaust gas may be removed. Furthermore, the particulate filter may remove the particulate matter to lower the concentration of the particulate matter within the lowered temperature exhaust gas by one of a cyclonic separation process, an electrostatic process, a tortuous path filtration process, or a process of passing the lowered temperature exhaust gas through a media filter, a venturi type scrubber, a liquid bath filter, a catalytic converter, or a diesel particulate filter. Additionally, passing the lowered temperature exhaust gas through the particulate filter may include pumping the lowered temperature exhaust gas through the particulate filter using the first pump.

Additionally, at step 408, the lowered particulate concentration and lowered temperature exhaust gas may be passed through one or more membrane modules to produce a membrane module permeate flow that contains a higher concentration of $CO_2$ compared to a concentration of $CO_2$ in the lowered particulate concentration and lowered temperature exhaust gas. Further, passing the lowered particulate concentration and lowered temperature exhaust gas through one or more membrane modules may further produce a membrane module retentate flow that contains a lower concentration of $CO_2$ compared to the concentration of $CO_2$ in the lowered particulate concentration and lowered temperature exhaust gas. Furthermore, passing the lowered particulate concentration and lowered temperature exhaust gas through the one or more membrane modules may include pumping the lowered particulate concentration and lowered temperature exhaust gas through the one or more membrane modules using a second pump. In one or more embodiments, the one or more membrane modules may include a first membrane module and a second membrane module. Further, passing the lowered particulate concentration and lowered temperature exhaust gas through the one more membrane modules may include passing the lowered particulate concentration and lowered temperature exhaust gas through the first membrane module and the second membrane module in series. Furthermore, in one or more embodiments, the method 400 may further include, recirculating the membrane module retentate flow through the one or more membrane modules. Additionally, recirculating the membrane module retentate flow through the one or more membrane modules may include mixing the membrane module retentate flow with the lowered particulate concentration and lowered temperature exhaust gas.

At step 410, the produced membrane module permeate flow may be stored in a storage container. In one or more embodiments, the membrane module permeate flow may be stored in the storage container as a compressed gas or as a liquid. Further, in other embodiments, the membrane module permeate flow may be provided to a reactor to convert the membrane module permeate flow into a useable form, and then the useable form of the membrane module permeate flow may be stored, sold, or reutilized. Furthermore, in one or more embodiments, instead of storing the produced membrane module permeate flow, the produced membrane module permeate flow may be directly reutilized or sold.

Alternatively, at step 412, substantially pure $CO_2$ may be produced from the membrane module permeate flow using one or more adsorbent packed beds. In one or more embodiments, producing the substantially pure $CO_2$ from the membrane module permeate flow using one or more adsorbent packed beds may include injecting the membrane module permeate flow into the one or more adsorbent packed beds, extracting $CO_2$ from the membrane module permeate flow using a sorbent disposed within the one or more adsorbent packed beds, releasing the membrane module permeate flow after the $CO_2$ has been extracted, and applying one of a pressure swing by reducing a pressure within the one or more adsorbent packed beds or a temperature swing by raising a temperature of the one or more adsorbent packed beds. Further, injecting the membrane module permeate flow into the one or more adsorbent packed beds may include pumping the membrane module permeate flow into the one or more adsorbent packed beds using a third pump. Furthermore, releasing the membrane module permeate flow after the $CO_2$ has been extracted may include opening a release valve of the one or more adsorbent packed beds. Moreover, in one or more embodiments, the pressure swing may be applied by a vacuum. Additionally, applying the temperature swing by raising the temperature of the one or more adsorbent packed beds may include injecting the raised temperature fluid flowed through the heat exchanger into the one or more adsorbent packed beds by way of a heated fluid flow line. Further, in one or more embodiments, producing the substantially pure $CO_2$ from the membrane module permeate flow using one or more adsorbent packed beds may further include opening one or more valves coupled to the one or more adsorbent packed beds and pumping the substantially pure $CO_2$ out of the one or more adsorbent packed beds using a fourth pump. Furthermore, in one or more embodiments, the one or more adsorbent packed beds may include a first adsorbent packed bed and a second adsorbent packed bed coupled in parallel, where one or both of the first adsorbent packed bed and the second adsorbent packed bed may be used to produce the substantially pure $CO_2$ from the membrane module permeate flow. Further, in one or more embodiments, while one of the first adsorbent packed bed or the second adsorbent packed bed is extracting the $CO_2$ from the membrane module permeate flow by the sorbent, the other of the first adsorbent packed bed or the second adsorbent packed bed may be applying one of the pressure swing or the temperature swing.

Further, in one or more embodiments, at step 414, the produced substantially pure $CO_2$ may be stored in a storage container as either a compressed gas or a liquid. Storing the produced substantially pure $CO_2$ in the storage container may include pumping the substantially pure CO2 into the storage tank using the fourth pump. Further, in one or more embodiments, the stored substantially pure CO2 may be either reutilized or sold. Furthermore, in one or more embodiments, instead of storing the produced substantially pure CO2, the produced substantially pure CO2 may be directly reutilized or sold.

While in one or more embodiments, the method 400 includes steps 408 and 410, in other embodiments, steps 408 and 410 may be bypassed and the lowered particulate concentration and lowered temperature exhaust gas may be injected into the one or more adsorbent packed beds to produce substantially pure CO2.

According to one or more aspects of the present disclosure, the CO2 capture systems and methods disclosed provide an efficient, portable, and cost-effective system and method for extracting CO2 from an exhaust gas. The systems and methods for CO2 capture according to one or more aspects of the present disclosure allow for continuous extraction of CO2 from exhaust gas while using a smaller footprint of equipment. This continuous extraction of CO2 allows for larger amounts of exhaust gas to be processed at lesser costs and in lesser time.

An embodiment of the present disclosure is a method including: lowering a temperature of an exhaust gas using a heat exchanger; lowering a concentration of a particulate matter within the lowered temperature exhaust gas; and passing the lowered particulate concentration and lowered temperature exhaust gas through one or more membrane modules to produce a membrane module permeate flow that contains a higher concentration of carbon dioxide compared to a concentration of carbon dioxide in the lowered particulate concentration and lowered temperature exhaust gas.

In one or more embodiments described in the preceding paragraph, the method further includes producing a substantially pure carbon dioxide from the membrane module permeate flow using one or more adsorbent packed beds. Further, in one or more embodiments, producing the substantially pure carbon dioxide from the membrane module permeate flow using one or more adsorbent packed beds includes: injecting the membrane module permeate flow into the one or more adsorbent packed beds; extracting the substantially pure carbon dioxide from the membrane module permeate flow using a sorbent disposed within the one or more adsorbent packed beds; releasing the membrane module permeate flow after the substantially pure carbon dioxide has been extracted; and applying one of a pressure swing by reducing a pressure within the one or more adsorbent packed beds or a temperature swing by raising a temperature of the one or more adsorbent packed beds. Furthermore, in one or more embodiments, lowering the temperature of the exhaust gas using a heat exchanger includes: passing the exhaust gas through the heat exchanger; and flowing a heat exchanger fluid through the heat exchanger, where flowing the heat exchanger fluid through the heat exchanger raises a temperature of the heat exchanger fluid, and applying the temperature swing by raising the temperature of the one or more adsorbent packed beds includes injecting the raised temperature heat exchanger fluid flowed through the heat exchanger into the one or more adsorbent packed beds by way of a heated fluid flow line. Moreover, in one or more embodiments, the pressure swing is applied to the one or more adsorbent beds by a vacuum. Additionally, in one or more embodiments, the one or more adsorbent packed beds includes a first adsorbent packed bed and a second adsorbent packed bed coupled in parallel, and at least one of the first adsorbent packed bed and the second adsorbent packed bed are used to produce the substantially pure carbon dioxide from the membrane module permeate flow. Further, in one or more embodiments, the substantially pure carbon dioxide is extracted from the membrane module permeate flow using one of the first adsorbent packed bed or the second adsorbent packed bed, and one of the pressure swing or the temperature swing is applied using the other of the first adsorbent packed bed or the second adsorbent packed bed, simultaneously. Furthermore, in one or more embodiments, lowering the temperature of the exhaust gas using a heat exchanger includes pumping the exhaust gas through the heat exchanger using a first pump, passing the lowered particulate concentration and lowered temperature exhaust gas through the one or more membrane modules includes pumping the lowered particulate concentration and lowered temperature exhaust gas through the one or more membrane modules using a second pump, and injecting the membrane module permeate flow into the one or more adsorbent packed beds includes pumping the membrane module permeate flow into the one or more adsorbent packed beds using a third pump. Additionally, in one or more embodiments, the method further includes storing the produced substantially pure carbon dioxide in a storage container as one of a compressed gas or a liquid. Further, in one or more embodiments described in the preceding paragraph, the method further includes capturing an exhaust gas produced by an exhaust gas source. Furthermore, in one or more embodiments described in the preceding paragraph, the temperature of the exhaust gas is lowered to less than or equal to 200 degrees Fahrenheit. Additionally, in one or more embodiments described in the preceding paragraph, lowering the concentration of the particulate matter within the lowered temperature exhaust gas includes passing the lowered temperature exhaust gas through a particulate filter, and the particulate filter removes the particulate matter from the lowered temperature exhaust gas by one of a cyclonic separation process, an electrostatic process, a tortuous path filtration process, or a process of passing the lowered temperature exhaust gas through a media filter, a venturi type scrubber, a liquid bath filter, a catalytic converter, or a diesel particulate filter to lower the concentration of the particulate matter within the lowered temperature exhaust gas. Further, in one or more embodiments described in the preceding paragraph, passing the lowered particulate concentration and lowered temperature exhaust gas through one or more membrane modules further produces a membrane module retentate flow that contains a lower concentration of carbon dioxide compared to the concentration of carbon dioxide in the lowered particulate concentration and lowered temperature exhaust gas, and the method further includes recirculating the membrane module retentate flow through the one or more membrane modules. Furthermore, in one or more embodiments described in the preceding paragraph, the one or more membrane modules includes a first membrane module and a second membrane module, and passing the lowered particulate concentration and lowered temperature exhaust gas through the one more membrane modules includes passing the lowered particulate concentration and lowered temperature exhaust gas through the first membrane module and the second membrane module in series. Additionally, in one or more embodiments described in the preceding paragraph, the method further includes storing the produced membrane module permeate flow in a storage container.

Another embodiment of the present disclosure is a system for extracting carbon dioxide from an exhaust gas. The system includes: a heat exchanger configured to lower a temperature of the exhaust gas; a particulate filter fluidly coupled to the heat exchanger and configured to lower a concentration of a particulate matter within the exhaust gas; and one or more membrane modules fluidly coupled to the particulate filter and configured to produce a membrane module permeate flow from the exhaust gas that contains a higher concentration of carbon dioxide compared to a concentration of carbon dioxide in the exhaust gas.

In one or more embodiments described in the preceding paragraph, the system further includes one or more adsorbent packed beds fluidly coupled to the one or more membrane modules, where the one or more adsorbent packed beds is configured to produce a substantially pure carbon dioxide from the membrane module permeate flow, and where the one or more adsorbent packed beds includes a sorbent configured to extract carbon dioxide from the membrane module permeate flow. Further, in one or more embodiments, the one or more adsorbent packed beds includes a first adsorbent packed bed and a second adsorbent packed bed coupled in parallel, the first adsorbent packed bed is fluidly coupled to the one or more membrane modules, and the second adsorbent packed bed is fluidly coupled to the one or more membrane modules. Furthermore, in one or more embodiments, the one or more membrane modules includes a first membrane module and a second membrane module fluidly coupled in series, the first membrane module is fluidly coupled to the particulate filter, and the second membrane module is fluidly coupled to the one or more adsorbent packed beds. Additionally, in one or more embodiments, the system further includes: a first pump fluidly coupled to the heat exchanger; a second pump fluidly coupled between the particulate filter and the one or more membrane modules; and a third pump fluidly coupled between the one or more membrane modules and the one or more adsorbent packed beds. Further, in one or more embodiments, the system further includes a heated fluid flow line fluidly coupled between the heat exchanger and the one or more adsorbent packed beds, where the heated fluid flow line is configured to inject a heated heat exchanger fluid from the heat exchanger into the one or more adsorbent packed beds. Furthermore, in one or more embodiments, the system further includes one or more mobile units, where the heat exchanger, the particulate filter, the one or more membrane modules, and the one or more adsorbent packed beds are disposed on the one or more mobile units.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
lowering a temperature of an exhaust gas using a heat exchanger;
lowering a concentration of a particulate matter within the lowered temperature exhaust gas;
passing the lowered particulate concentration and lowered temperature exhaust gas through one or more membrane modules to produce a membrane module permeate flow that contains a higher concentration of carbon dioxide compared to a concentration of carbon dioxide in the lowered particulate concentration and lowered temperature exhaust gas; and
producing a substantially pure carbon dioxide from the membrane module permeate flow using one or more adsorbent packed beds,
wherein producing the substantially pure carbon dioxide from the membrane module permeate flow using one or more adsorbent packed beds comprises:
injecting the membrane module permeate flow into the one or more adsorbent packed beds;
extracting the substantially pure carbon dioxide from the membrane module permeate flow using a sorbent disposed within the one or more adsorbent packed beds;
releasing the membrane module permeate flow after the substantially pure carbon dioxide has been extracted; and
applying one of a pressure swing by reducing a pressure within the one or more adsorbent packed beds or a temperature swing by raising a temperature of the one or more adsorbent packed beds.

2. The method of claim 1, wherein:
lowering the temperature of the exhaust gas using a heat exchanger comprises:
passing the exhaust gas through the heat exchanger; and
flowing a heat exchanger fluid through the heat exchanger, wherein flowing the heat exchanger fluid through the heat exchanger raises a temperature of the heat exchanger fluid; and
applying the temperature swing by raising the temperature of the one or more adsorbent packed beds comprises:
injecting the raised temperature heat exchanger fluid flowed through the heat exchanger into the one or more adsorbent packed beds by way of a heated fluid flow line.

3. The method of claim 1, wherein:
the pressure swing is applied to the one or more adsorbent beds by a vacuum.

4. The method of claim 1, wherein:
the one or more adsorbent packed beds includes a first adsorbent packed bed and a second adsorbent packed bed coupled in parallel; and
at least one of the first adsorbent packed bed and the second adsorbent packed bed are used to produce the substantially pure carbon dioxide from the membrane module permeate flow.

5. The method of claim 4, wherein:
the substantially pure carbon dioxide is extracted from the membrane module permeate flow using one of the first adsorbent packed bed or the second adsorbent packed bed; and one of the pressure swing or the temperature swing is applied using the other of the first adsorbent packed bed or the second adsorbent packed bed, simultaneously.

6. The method of claim 1, wherein:
lowering the temperature of the exhaust gas using a heat exchanger comprises:
pumping the exhaust gas through the heat exchanger using a first pump;
passing the lowered particulate concentration and lowered temperature exhaust gas through the one or more membrane modules comprises:
pumping the lowered particulate concentration and lowered temperature exhaust gas through the one or more membrane modules using a second pump; and
injecting the membrane module permeate flow into the one or more adsorbent packed beds comprises:
pumping the membrane module permeate flow into the one or more adsorbent packed beds using a third pump.

7. The method of claim 1 further comprising:
storing the produced substantially pure carbon dioxide in a storage container as one of a compressed gas or a liquid.

8. The method of claim 1 further comprising:
capturing the exhaust gas produced by an exhaust gas source.

9. The method of claim 1 wherein the temperature of the exhaust gas is lowered to less than or equal to 200 degrees Fahrenheit.

10. The method of claim 1, wherein:
lowering the concentration of the particulate matter within the lowered temperature exhaust gas comprises:
passing the lowered temperature exhaust gas through a particulate filter; and
the particulate filter removes the particulate matter from the lowered temperature exhaust gas by one of a cyclonic separation process, an electrostatic process, a tortuous path filtration process, or a process of passing the lowered temperature exhaust gas through a media filter, a venturi scrubber, a liquid bath filter, a catalytic converter, or a diesel particulate filter to lower the concentration of the particulate matter within the lowered temperature exhaust gas.

11. The method of claim 1, wherein:
passing the lowered particulate concentration and lowered temperature exhaust gas through one or more membrane modules further produces a membrane module retentate flow that contains a lower concentration of carbon dioxide compared to the concentration of carbon dioxide in the lowered particulate concentration and lowered temperature exhaust gas; and
the method further comprises:
recirculating the membrane module retentate flow through the one or more membrane modules.

12. The method of claim 1, wherein:
the one or more membrane modules includes a first membrane module and a second membrane module; and
passing the lowered particulate concentration and lowered temperature exhaust gas through the one more membrane modules includes passing the lowered particulate concentration and lowered temperature exhaust gas through the first membrane module and the second membrane module in series.

13. The method of claim 1, further comprising:
storing the produced membrane module permeate flow in a storage container.

14. The method of claim 1, wherein the temperature of the exhaust gas is lowered to less than or equal to 100 degrees Fahrenheit.

15. A system for extracting carbon dioxide from an exhaust gas, comprising:
a heat exchanger, wherein the heat exchanger is configured to lower a temperature of the exhaust gas;
a particulate filter fluidly coupled to the heat exchanger, wherein the particulate filter is configured to lower a concentration of a particulate matter within the exhaust gas;
one or more membrane modules fluidly coupled to the particulate filter, wherein the one or more membrane modules is configured to produce a membrane module permeate flow from the exhaust gas that contains a higher concentration of carbon dioxide compared to a concentration of carbon dioxide in the exhaust gas; and
one or more adsorbent packed beds fluidly coupled to the one or more membrane modules, wherein the one or more adsorbent packed beds is configured to produce a substantially pure carbon dioxide from the membrane module permeate flow,
wherein the one or more adsorbent packed beds comprises:
a sorbent configured to extract carbon dioxide from the membrane module permeate flow.

16. The system of claim 15, wherein:
the one or more adsorbent packed beds includes a first adsorbent packed bed and a second adsorbent packed bed coupled in parallel;
the first adsorbent packed bed is fluidly coupled to the one or more membrane modules; and
the second adsorbent packed bed is fluidly coupled to the one or more membrane modules.

17. The system of claim 15, wherein:
the one or more membrane modules includes a first membrane module and a second membrane module fluidly coupled in series;
the first membrane module is fluidly coupled to the particulate filter; and
the second membrane module is fluidly coupled to the one or more adsorbent packed beds.

18. The system of claim 15, further comprising:
a first pump fluidly coupled to the heat exchanger;
a second pump fluidly coupled between the particulate filter and the one or more membrane modules; and
a third pump fluidly coupled between the one or more membrane modules and the one or more adsorbent packed beds.

19. The system of claim 15, further comprising:
a heated fluid flow line fluidly coupled between the heat exchanger and the one or more adsorbent packed beds, wherein the heated fluid flow line is configured to inject a heated heat exchanger fluid from the heat exchanger into the one or more adsorbent packed beds.

20. The system of claim 15, further comprising:
one or more mobile units, wherein the heat exchanger, the particulate filter, the one or more membrane modules, and the one or more adsorbent packed beds are disposed on the one or more mobile units.

* * * * *